Jan. 8, 1963     TAISHO IKETANI     3,072,157
FUEL INJECTING VALVE FOR A LIQUEFIED GAS CIGARETTE LIGHTER
Filed March 13, 1961

INVENTOR.
Taisho Iketani
BY Ernest J. Montague
Attorney

United States Patent Office 3,072,157
Patented Jan. 8, 1963

3,072,157
FUEL INJECTING VALVE FOR A LIQUEFIED GAS CIGARETTE LIGHTER
Taisho Iketani, 589 1-chome, Nogata-cho, Nakano-ku, Tokyo, Japan
Filed Mar. 13, 1961, Ser. No. 95,238
Claims priority, application Japan July 21, 1960
3 Claims. (Cl. 141—293)

The present invention relates to a fuel injecting valve for a liquefied gas cigarette lighter. Liquefied gas cigarette lighters are known, wherein a valve is arranged inside the fuel tank of the lighter, so that the fuel gas can be injected into the tank. A predetermined portion of the tank is not filled with the gas, when the gas, which is compressed and liquefied after being injected into the supply bomb, is injected into said tank.

Fuel, generally used as fuel for this kind of cigarette lighter, is butane gas, whose coefficient of expansion is very high. Thus the gas increases in volume by 2% when its temperature is raised up to 10° C. While the gas is injected into the lighter, the temperature of the gas itself and that of the lighter are maintained at a low temperature, so that there is no danger owing to the expansion of the gas, but when the temperature of the injected gas goes back to that of the surroundings after the gas is injected, the gas expands and is apt to break the fuel tank. A fuel injection valve, which is so arranged as to keep a predetermined portion in the tank free of gas and allowing the air to expand for the purpose of removing the above stated danger, has already been known.

It is one object of the present invention to provide a fuel injection valve of simplified structure.

It is another object of the present invention to provide a fuel injection valve which permits bleeding during the filling of the fuel tank.

With these and other objects in view, which will become apparent in the following detailed description, the present invention will be clearly understood in connection with the accompanying drawings, in which.

Figure 1:
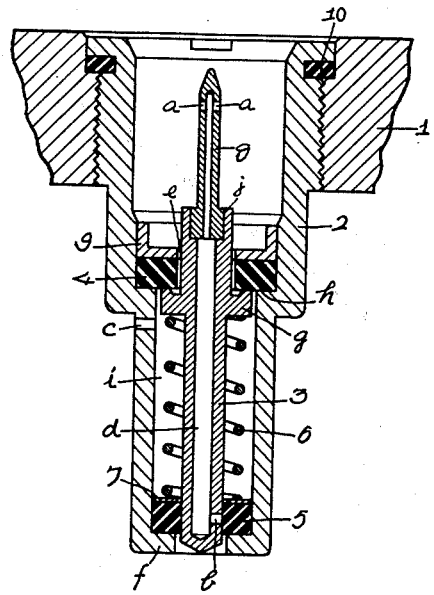
FIGURE 1 is an axial section of an embodiment of the present invention.

Referring now to the drawings, and in particular to FIG. 1, the embodiment shown therein comprises a wall 1 forming the fuel tank and a fixed tube or upper cylindrical member 2 forming a cylinder with a bottom. A packing 10 is disposed at the outside circumference of the opening end, the packing 10 being compressed, so as to be thrust onto a shoulder of the wall 1 for the purpose of fixing the tube 2. The packing 10 prevents leakage to the outside of the fuel gas in the fuel tank through the circumference of the fixed tube or upper cylindrical member 2.

As mentioned above, the fixed tube 2, which is secured to the wall 1 and the greater part of which is thrust into the fuel tank, reduces its diameter from its center to its lower end. A packing 5 is provided on the bottom wall $f$ of the fixed tube and a washer 7 is disposed on top of the packing 5.

A movable axial tube or inner stem member 3 and a flange 9, the latter having an upwardly directed surrounding wall, are arranged at about the center of the height of the cylindrical tube 2. Moreover, at the surrounding wall of the top end of the inner stem member 3 where the axial passage $d$ of the latter opens, there is secured to the stem member 3 a needle tube 8 having at least one bore $a$, which is the feeding or injection opening into which the gas as fuel is injected.

A coil spring 6 is disposed in the fixed tube or outer cylindrical member 2, such that the spring engages the washer 7 at its lower end and a flange $g$ at its upper end; the movable axial tube or stem member 3 is inserted into the fixed tube 2 and is extendable through a bore $k$ provided at the bottom $f$ thereof, so that the tube 3 passes through the interior of the fixed tube 2.

The washer 7 and the bottom wall $f$ of the fixed tube or outer cylindrical member 2 can be passed loosely by the inner end of the movable axial tube or stem member 3. Further, the packing 5 engages tightly the lower end of the movable axial tube or stem member 3, and the coil spring 6 engages the flange $g$ of the movable axial tube or stem member 3, which flange $g$ has an outer diameter smaller than the inner diameter of the fixed tube or outer cylindrical member 2.

A packing 4 is provided at about the center of the outer cylindrical member 2, through which the axial tube or stem member 3 passes loosely, since the inner diameter of the packing 4 is greater than the outer diameter of the corresponding portion of the stem member 3, and defining an annular slot therebetween. The packing 4 is inserted about the movable axial tube or stem member 3 from the side of the needle tube 8, so that the packing 4 is mounted on the outer cylindrical member 3 from the outer end thereof. Then the pressing ring 9 is thrust into the fixed outer cylinder 2 from its outer end, so that the cylindrical ring portion of the pressing ring 9 engages the inner face of the outer cylindrical member 2. The thrusting movement of the pressing ring 9 can be continued till the packing 4 is stopped at the inner shoulder $h$ formed by the outer cylindrical member 2, and in this position the bottom end of the movable stem member 3 with its axial passage $d$, closed at its bottom and open at its top, extends into and through the packing 5, as well as into the bottom opening $k$ of the outer cylindrical member 2. The bore or radial passage $b$ opening toward the side surface of the movable axial tube 2, as injection opening for the fuel gas near the bottom of the axial passage $d$ is closed by the packing 5 in the inoperative position of the stem member 3.

Thus the flange $g$ forming an upwardly or outwardly directed annular seat of the movable axial tube 3 is urged against the bottom face of the packing 4 by means of the spring 6, and if the inner end of the movable axial tube 3 engages airtightly the packing 5, a closed chamber $i$ is formed in the fixed tube 2 between the packing 4 and the packing 5. This chamber $i$ has a communication bore $c$ arranged on the side wall of the fixed tube 2, and communicates with the interior of the fuel tank formed by the side wall of the fixed tube 2. Upon positioning of the movable axial tube 3 in the direction of the axis of the fixed tube 2 in its outermost position, the outer end of the needle tube 8 never projects outwardly beyond the opening end of the fixed tube 2.

Now, if the discharge opening of the supply bomb (not shown), which contains generally known combustible gas in a compressed liquefied condition, is set into engagement toward the needle tube 8 to be thrust against the shoulder $j$ which is the upper end of the movable axial tube 3, and the needle tube 8 is inserted deeply into the bomb (not shown), then the surrounding wall of the gas discharge of the bomb engages the outer end of the movable axial tube 3 and urges the latter inwardly or outwardly, simultaneously compressing the spring 6, Due to this axial movement, the annular seat of the flange $g$ is disengaged from the packing 4. At that moment the fuel tank communicates with the open air through the communicating bore $c$, into the chamber $i$, through the annular space formed between the inner face of the packing 4 and of the flange portion of the pressing ring 9 and the outer face of the stem member 3. If the supply bomb is further pushed inwardly into the outer cylindrical member 3 and the movable axial tube 3 is further moved inwardly, the bore $b$ leaves the inner face of the packing 5 and opens into the fuel tank, so that the liquefied gas as fuel passes through the needle tube 8, the axial passage $d$, open at its outer end, and the radial bore $b$ into the fuel tank. In the full course of this operation, the gas evaporated in the tank will move to the outside through the communication bore $c$. Now, if the level of the liquefied gas, which has been fed into the fuel tank, reaches the communication bore $c$, then the liquefied gas will blow out or bleed through the latter. Accordingly, the feeding into the tank of the liquefied gas to be injected therein is actually stopped when the level of the liquefied gas reaches the communication bore $c$, in spite of the fact that the bomb is still connected with the stem member 3.

Furthermore, if the supply bomb is removed, the movable axial tube 3 moves upwardly again due to the action of the spring 6, until the annular seat of the flange $g$ engages again the packing 4 and the radial bore $b$ is closed by the packing 5. The chamber $i$ is then closed again from the atmosphere.

Figure 2:
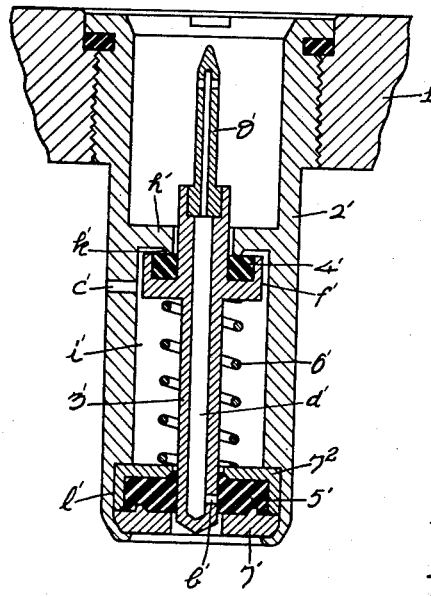
FIG. 2 is an axial section of another embodiment thereof.

Referring now again to the drawings, and in particular to FIGURE 2, the embodiment disclosed therein is substantially identical with that shown in FIG. 1, but in the former embodiment, the fixed tube is replaced by a fixed tube $2'$ forming a straight cylinder, and a ring-shaped flange $h'$ is arranged inside the fixed tube $2'$ to form an annular seat $k'$ equal to the annular seat shown in FIG. 1. This is brought about by providing an inner diameter of the flange $h'$ which is larger than the outer diameter of the movable axial tube $3'$ passing loosely through a central bore of the flange $h'$. The annular seat $k'$ is directed downwardly. Moreover, the packing 4 and the packing 5 are replaced, respectively, by the packing $4'$ and the packing $5'$. The packing $4'$ is supported by a flange $f'$ extending outwardly from the movable axial tube $3'$, and engages the downwardly directed annular seat $k'$ secured to the flange $h'$ under the pressure of the coil spring 6. The packing $5'$ has a washer $7^2$ mounted thereon and has a washer $7'$ underneath. The packing $5'$ is disposed in the seat part $l'$ formed at the inner end of the fixed tube $2'$ and is retained in its position by bending inwardly the inner or lower end of the fixed tube $2'$.

The radial bore $b'$ provided at the inner end of the movable axial tube $3'$ is closed in the inoperative position of the movable axial tube $3'$ by the packing $5'$, which thus closes also the axial passage $d'$. The washer $7^2$ together with the washer $7'$ permit the axial movement of the tube $3'$.

In the second embodiment of the present invention, the movable axial tube $3'$ is inserted through the inner open end of the fixed tube $2'$ and moved outwardly or upwardly in the latter until the packing $4'$ engages the inwardly directed annular seat $k'$ of the flange $h'$. Then the coil spring $6'$ disposed between the flange $f'$ and the washer $7^2$, inserted from the inner or lower end of the fixed tube $2'$, in a manner to surround the movable tube $3'$. Then, while the coil spring $6'$ is being compressed, the washer $7^2$, the packing $5'$ and finally the washer $7'$ are inserted by surrounding the movable axial tube $3'$, and the inner or lower end of the fixed tube $2'$ is then bent inwardly.

In addition, the movable axial tube $3'$ moves inwardly or downwardly against the force of the coil spring 6 by applying the gas discharge of the supply bomb (not shown) to the needle tube $8'$ of the stem member $3'$, so that the gas discharge of the bomb may be fed through the needle tube $8'$. Due to this axial inward movement of the stem member $3'$, the packing $4'$ disengages the annular seat $k'$ arranged on the flange $h'$, and the chamber $i'$ in the fixed tube $2'$ connects with the atmosphere. When the radial passage $b'$ is exposed to the interior of the fuel tank $1'$, likewise as a result of the axial movement of the stem member $3'$, at first the liquefied gas in the bomb flows into the fuel tank. Next, when the level of the liquefied gas, which has been fed into the fuel tank, reaches the discharge bore $c'$, the gas escapes from the communication bore $c'$ through the annular channel formed between the flange $h'$ and the stem member $3'$ to the outside atmosphere.

If the bomb is removed, the movable tube or stem member $3'$ performs an axial outward movement due to the force of the coil spring $6'$ and the radial passabe $b'$ is closed up again by the packing $5'$. The chamber $i'$ will then also be closed from the atmosphere, due to the engagement of the packing $4'$ with the annular seat $k'$.

In accordance with the present invention, only the injection passage is arranged at the movable axial tube $3'$. Therefore, the working of the lighter, designed according to the present invention, is very simple, as compared with that of the known types of cigarette lighters equipped with an escaping passage in addition to the taking-in passage in the movable member. Further, since the mouth of the escaping passage is arranged apart from the exit of the taking-in passage, the liquefied gas which is fed into the tank never blows out or bleeds from the taking-in passage, which makes the handling of the lighter very safe.

While I have disclosed several embodiments of the present invention, it is to be understood that these embodiments are given by example only and not in a limiting sense, the scope of the present invention being determined by the objects and the claims.

I claim:

1. A fuel injection valve for a liquefied gas lighter comprising an immovable hollow cylindrical member adapted to be secured to a container of said lighter and having a discharge opening through the side wall thereof, a stem member axially movable in said cylindrical member and having an axial feeding passage open externally at its outer end and closed at its lower end except to a radial passage terminating at the periphery of said stem member, a first packing ring, means for securing said packing ring to one of said members at a point disposed axially outwardly relative to said discharge opening, an annular seat formed on the other of said members and engaging said first packing ring disposed in said one of said members, in order to seal off against the atmosphere a chamber defined in said cylindrical member, a second packing ring immovably secured to said cylindrical member at its inner portion sealingly surrounding said stem member and sealing said radial passage of said stem member in the outermost, inoperative position of the latter, spring means urging said stem member into its outermost said first packing ring engaging position, means defining an annular passage between said immovable cylindrical member and said axially movable stem member, said annular passage providing communication between said discharge opening and the ambient atmosphere in the operative position of said stem member, and said radial passage communicating with said container in the operative position of said stem member.

2. A fuel injection valve for a liquefied gas lighter comprising an immovable hollow cylindrical member adapted to be secured to a container of said lighter and having a discharge opening through the side wall thereof, a stem member axially movable in said cylindrical member and having an axial feeding passage open externally at its outer end and closed at its lower end except to a radial passage terminating at the periphery of said stem member, a first packing ring, said cylindrical member consisting of a first outer part of greater diameter and a second inner part of smaller diameter and forming a shoulder between said parts, said first packing ring being supported on said shoulder axially outwardly relative to said discharge opening and having a bore of a diameter slightly larger than the outer diameter of said stem member, to define an annular passage therebetween, means holding said first packing ring against said shoulder, said stem member having a flange and forming an annular seat extending axially outwardly from said flange to engage said first packing ring in the inoperative position of said stem member, a second packing ring immovably secured to said cylindrical member at its inner portion, sealingly surrounding said stem member and sealing said radial passage of said stem member in the outermost, inoperative position of the latter, spring means urging said stem member into its outermost, said first packing ring engaging position, and said annular passage providing communication between said discharge opening and the ambient atmosphere in the operative position of said stem member.

3. A fuel injection valve for a liquefied gas lighter comprising an immovable hollow cylindrical member adapted to be secured to a container of said lighter and having a discharge opening through the side wall thereof, a stem member axially movable in said cylindrical member and having an axial feeding passage open externally at its outer end and closed at its lower end except to a radial passage terminating at the periphery of said stem member, a first packing ring, said cylindrical member including a radially inwardly extending flange having a bore of a diameter slightly larger than the outer diameter of said stem member and defining an annular passage therebetween and said flange forming an axially inwardly directed annular seat sealingly engaging said first packing ring in the inoperative position of said stem member, said stem member having a radially outwardly extending flange opposite said radially inwardly extending flange of said cylindrical member and said first packing ring being supported by said flange of said stem member, a second packing ring immovably secured to said cylindrical member at its inner portion, sealingly surrounding said stem member and sealing said radial passage of said stem member in the outermost, inoperative position of the latter, spring means urging said stem member into its outermost, said annular seat engaging position, and said annular passage providing communication between said discharge opening and the ambient atmosphere in the operative position of said stem member.

References Cited in the file of this patent
UNITED STATES PATENTS 2,769,325   Storch ------------------ Nov. 6, 1956

FOREIGN PATENTS 726,982    Great Britain ---------- Mar. 23, 1955
812,975    Great Britain ---------- May 6, 1959